Nov. 3, 1931.     H. V. REED     1,830,521
CLUTCH PLATE
Filed March 7, 1929
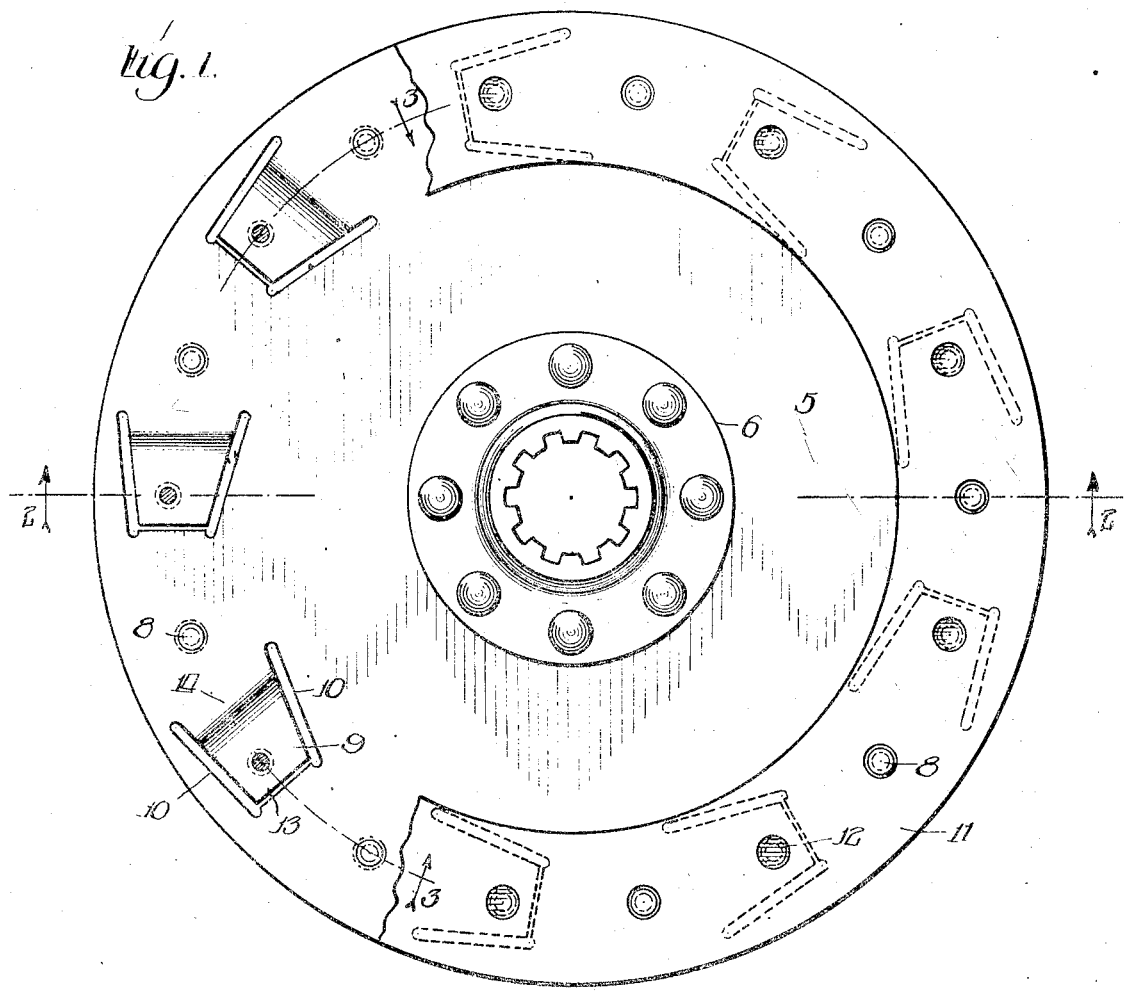
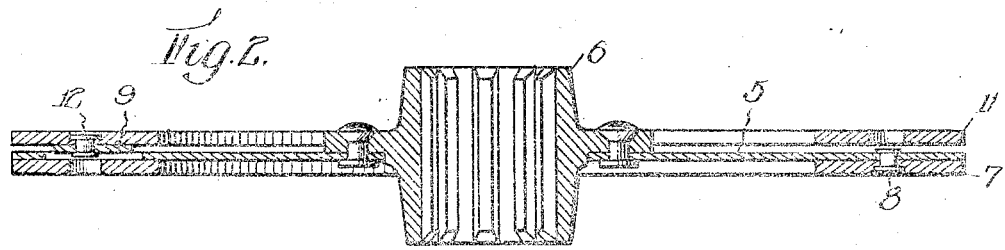
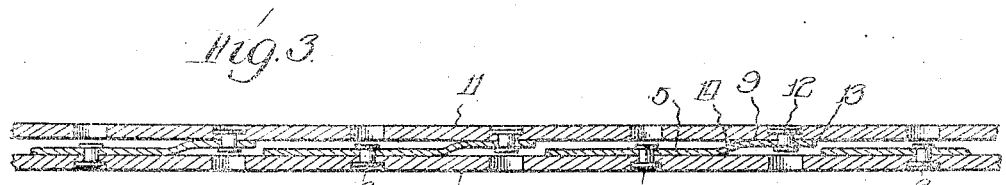
Inventor
Harold V. Reed
By Wm. O. Belt
atty.

Patented Nov. 3, 1931

1,830,521

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

CLUTCH PLATE

Application filed March 7, 1929. Serial No. 345,141.

This invention relates to friction clutches of the kind wherein a friction plate is interposed between two parts of a driving member and is adapted to be gripped or clamped by the parts under sufficient pressure to impart motion from the driving member to the driven member of the clutch. The invention is particularly desirable in a friction clutch for automotive vehicles.

The object of the invention is to provide a novel clutch plate having friction rings which will take hold smoothly and evenly throughout the contact area when pressure is initially applied and by a yielding but rapid progressive action make the clutch act quickly and efficiently without grabbing or jerking.

Another object of the invention is to provide a clutch plate with continuous friction rings and to make full engagement between the friction rings and the driving member throughout the application of pressure, whereby to secure maximum efficiency in a rapid progressive movement and without uneven wear on the rings.

And a further object of the invention is to provide a clutch plate with a relatively fixed friction ring on one side and a yieldingly mounted and relatively movable friction ring on its other side, the arrangement being such that both rings make full engagement with contacting parts throughout the pressure application and the relatively movable ring providing a yielding and progressive clutch engagement.

In the accompanying drawings I have illustrated a selected embodiment of the invention and referring thereto Fig. 1 is a side elevation of the clutch plate showing one of the friction rings partly broken away.

Fig. 2 is a sectional view on the line 2—2 of Fig. 1.

Fig. 3 is a sectional view on the line 3—3 of Fig. 1.

Referring to the drawings the clutch plate comprises a disk 5 mounted on a hub 6 and it is provided with a friction ring 7 which is secured flat to one side of the plate by rivets 8 or other suitable fastening devices. The plate is provided with a plurality of wings 9 spaced apart annularly within the periphery of the plate and all extending in the same direction. Each wing is struck up from the plate and I prefer to provide relatively wide slits 10 at the sides of the wing to insure freedom of action of the wing. The wings are all bent outward slightly from that side of the plate opposite to the ring 7 and a similar ring 11 is fastened by rivets 12 or other suitable fastening means to these wings adjacent the free ends 13. The slits 10 diverge and the wings taper preferably, being narrower at their free ends 13 than at their rear ends 14 where they connect with the plate. This provides a wing of substantial strength and rigidity to function in accordance with my invention and resist wear and the effects of heat. The tapering wing provides a yielding support for the movable friction ring 11 which is yieldable to the maximum degree upon first application of pressure and gradually increases in resistance to the pressure as the pressure application advances. The invention provides a novel and simple form of driven plate which is adapted to give a yielding and progressive engagement of the clutch to provide a soft action. All of the wings are compressed simultaneously and uniformly and therefore any annular shift of the movable ring is bodily and will not tend to loosen the fastenings.

I have shown the invention in a simple form suitable for embodiment in an automotive clutch but I reserve the right to make all such changes in the form, construction and arrangement of parts as may be necessary or desirable to adapt the invention for other clutches, or for other purposes, and within the scope of the following claims:

I claim:

1. A clutch plate having a plurality of wings off-set on one side thereof, spaced apart within the periphery of the plate and all extending annularly in the same direction, a friction ring fastened to said wings on one side of the plate, and a friction ring fastened to the other side of the plate.

2. A clutch plate having a plurality of wings spaced apart within the periphery of the plate and all extending annularly in the same direction, said wings being tapered and off-set on one side of the plate, a friction ring fastened to said wings adjacent the free ends thereof and on one side of the plate, and a friction ring fastened to the other side of the plate.

3. A clutch plate having a plurality of wings spaced apart within the periphery of the plate and all extending annularly in the same direction, said wings being relatively narrow at their free ends and wide at their rear ends where they connect with the plate, a continuous friction ring fastened to said wings adjacent the free ends thereof and on one side of the plate, and a friction ring fastened to the other side of the plate.

4. A clutch plate having a plurality of wings off-set on one side thereof to form a yielding support, a relatively fixed continuous friction ring fastened to the plate on the side opposite the wings, and a friction ring mounted on said wings and yieldingly movable towards and from the fixed friction ring.

5. A clutch plate including a friction ring, means rigidly fastening the ring to the plate at one side thereof, a continuous friction ring, and means unitary with said plate and intermediate said fastening means for yieldably supporting the continuous friction ring to permit said continuous friction ring to move progressively toward the plate under clutching pressure.

HAROLD V. REED.